(12) United States Patent
Fang

(10) Patent No.: US 12,132,993 B2
(45) Date of Patent: Oct. 29, 2024

(54) DISPLAY METHOD, IMAGING METHOD AND RELATED DEVICES

(71) Applicant: SZ DJI TECHNOLOGY CO., LTD., Shenzhen (CN)

(72) Inventor: Xinyue Fang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 10 days.

(21) Appl. No.: 17/652,738

(22) Filed: Feb. 28, 2022

(65) Prior Publication Data
US 2022/0182551 A1   Jun. 9, 2022

Related U.S. Application Data

(63) Continuation of application No. PCT/CN2019/103316, filed on Aug. 29, 2019.

(51) Int. Cl.
*H04N 23/69* (2023.01)
*B64C 39/02* (2023.01)
(Continued)

(52) U.S. Cl.
CPC ............ *H04N 23/69* (2023.01); *H04N 23/62* (2023.01); *H04N 23/631* (2023.01);
(Continued)

(58) Field of Classification Search
CPC ...... H04N 23/69; H04N 23/62; H04N 23/631; H04N 23/632; H04N 23/633; H04N 23/634; H04N 23/635; H04N 23/695; H04N 23/661; H04N 23/64; H04N 23/67; H04N 23/80; B64C 39/024; B64U 2101/30
See application file for complete search history.

(56) References Cited

U.S. PATENT DOCUMENTS

| | | | |
|---|---|---|---|
| 2003/0160886 A1* | 8/2003 | Misawa | H04N 23/45 348/240.1 |
| 2005/0100087 A1 | 5/2005 | Hasegawa et al. | |

(Continued)

FOREIGN PATENT DOCUMENTS

| | | |
|---|---|---|
| CN | 1979335 A | 6/2007 |
| CN | 101090442 A | 12/2007 |

(Continued)

OTHER PUBLICATIONS

The World Intellectual Property Organization (WIPO) International Search Report for PCT/CN2019/103316 May 20, 2020 5 Pages (including translation).

*Primary Examiner* — Timothy J Henn
(74) *Attorney, Agent, or Firm* — ANOVA LAW GROUP, PLLC

(57) ABSTRACT

A display method. The display method is applied to a control terminal, and the control terminal is used to communicate with an imaging device. The imaging device includes a wide-angle lens and a zoom lens, and the control terminal includes a display interface. The display method includes displaying an image obtained by the wide-angle lens in the display interface, obtaining a first user operation acting on the display interface, and displaying a first detail imaging area in the display interface in response to the first user operation. The first detail imaging area is being used to display an imaging range of the zoom lens.

20 Claims, 9 Drawing Sheets

(51) Int. Cl.
*B64U 101/30* (2023.01)
*H04N 23/62* (2023.01)
*H04N 23/63* (2023.01)

(52) U.S. Cl.
CPC ......... *H04N 23/632* (2023.01); *H04N 23/633* (2023.01); *H04N 23/634* (2023.01); *H04N 23/635* (2023.01); *B64C 39/024* (2013.01); *B64U 2101/30* (2023.01)

(56) References Cited

U.S. PATENT DOCUMENTS

| | | | | |
|---|---|---|---|---|
| 2010/0277620 | A1* | 11/2010 | Iijima | H04N 25/44 |
| | | | | 348/222.1 |
| 2011/0242369 | A1* | 10/2011 | Misawa | H04N 23/45 |
| | | | | 348/240.2 |
| 2012/0268641 | A1 | 10/2012 | Kazama | |
| 2014/0253693 | A1* | 9/2014 | Shikata | H04N 23/69 |
| | | | | 348/47 |
| 2015/0316927 | A1 | 11/2015 | Kim et al. | |
| 2016/0321503 | A1 | 11/2016 | Zhou | |
| 2018/0149138 | A1 | 5/2018 | Thiercelin et al. | |
| 2018/0220066 | A1* | 8/2018 | Kitamura | G06V 20/20 |
| 2018/0227489 | A1* | 8/2018 | Ho | H04N 23/611 |
| 2018/0262691 | A1* | 9/2018 | Wakabayashi | H04N 23/667 |
| 2018/0288310 | A1* | 10/2018 | Goldenberg | H04N 23/635 |
| 2019/0045135 | A1* | 2/2019 | Ryu | H04N 23/635 |
| 2019/0082101 | A1* | 3/2019 | Baldwin | H04N 23/632 |
| 2019/0260947 | A1* | 8/2019 | Imazu | H04N 23/69 |

FOREIGN PATENT DOCUMENTS

| | | |
|---|---|---|
| CN | 104184947 A | 12/2014 |
| CN | 106506965 A | 3/2017 |
| CN | 106791377 A | 5/2017 |
| CN | 106791400 A | 5/2017 |
| CN | 106993131 A | 7/2017 |
| CN | 107079106 A | 8/2017 |
| CN | 107749944 A | 3/2018 |
| CN | 108377341 A | 8/2018 |
| CN | 109639956 A | 4/2019 |
| JP | 2019015765 A | 1/2019 |

* cited by examiner

DISPLAY METHOD, IMAGING METHOD AND RELATED DEVICES

CROSS-REFERENCE TO RELATED APPLICATION

This application is a continuation of International Application No. PCT/CN2019/103316, filed on Aug. 29, 2019, the entire content of which is incorporated herein by reference.

TECHNICAL FIELD

The present disclosure relates to the technical field of mobile device user experience design and, more specifically, to a display method, an imaging method, and related devices.

BACKGROUND

During surveys or inspections, the following needs are often encountered. For example, an image of a 100-meter iron tower needs to be taken, and every detail of the of the detail parts of the iron tower need to be checked to determine if any screws are rusted, or the steel is abnormal.

However, in traditional technology, it is difficult to shoot with a combination of wide-angle and high-power zoom lenses. A user cannot conveniently perform the functional operations of the combined lens through the software application, nor can the user intuitively obtain the parameter changes of the combined lens, and the user experience is poor.

SUMMARY

One aspect of the present disclosure provides a display method. The display method is applied to a control terminal, and the control terminal is used to communicate with an imaging device. The imaging device includes a wide-angle lens and a zoom lens, and the control terminal includes a display interface. The display method includes displaying an image obtained by the wide-angle lens in the display interface, obtaining a first user operation acting on the display interface, and displaying a first detail imaging area in the display interface in response to the first user operation. The first detail imaging area is being used to display an imaging range of the zoom lens.

Another aspect of the present disclosure provides an imaging method. The imaging method is applied to an imaging device. The imaging device includes a wide-angle lens and a zoom lens, and the imaging device is in communication connection with a control terminal. The control terminal is being used to display an imaging result. The imaging method includes obtaining an imaging instruction sent by the control terminal, the imaging instruction carrying information of a first detail imaging area, obtaining a first imaging result through the wide-angle lens in response to the imaging instruction, obtaining one or more second imaging results through the zoom lens based on the first detail imaging area, and sending the first imaging result and the second imaging result to the control terminal. The first detail imaging area includes one or more sub-areas, and each second imaging result corresponds to a sub-area. An imaging angle of each second imaging result is calculated by the imaging device. A resolution of the image imaging result is higher than a resolution of the first imaging result.

BRIEF DESCRIPTION OF THE DRAWINGS

To more clearly illustrate the embodiments of the present disclosure or the technical solutions in the prior art, the drawings used in the description of the embodiments will be briefly described below.

DETAILED DESCRIPTION OF THE EMBODIMENTS

Technical solutions in the embodiments of the present disclosure are described clearly and completely in the following with reference to the accompanying drawings in the embodiments of the present disclosure.

Figure 1:
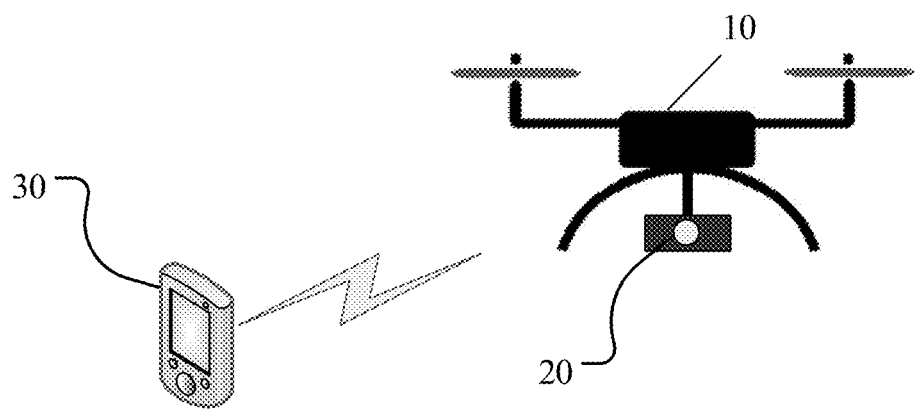
FIG. 1 is a schematic structural diagram of an imaging system according to an embodiment of the present disclosure.

FIG. 1 illustrates an imaging system according to an embodiment of the present disclosure. The system includes a movable platform 10, an imaging device 20, and a control terminal 30. In some embodiments, the movable platform 10 may be an aircraft (such as an unmanned aerial vehicle), a gimbal cart, a handheld gimbal, a robot, etc. The control terminal 30 may be a device such as a mobile phone, a tablet computer, etc., and may also have a remote control function to realize remote control of the movable platform 10. The movable platform 10 may include a gimbal, and the imaging device 20 may be mounted on the gimbal. The imaging device 20 may include a first lens and a second lens, which may be respectively used to perform different imaging tasks. The first lens and the second lens may be lenses corresponding to the conventional imaging function of a camera. For example, the first lens and the second lens may be a wide-angle lens and a zoom lens, respectively. In some embodiments, the wide-angle lens may be used to obtain a complete image, and the zoom lens may be used to obtain high-definition details. The gimbal may be used to adjust the imaging angle of the imaging device 20, and the movable platform 10 may be used to ensure smooth movement without drift. The control terminal 30 may be used to control the movement of the movable platform 10. The control terminal 30 may also obtain the captured image returned by the imaging device 20 for the user to view. In addition, the control terminal 30 may also obtain the user's control instruction to the imaging device 20, and send the control instruction to the imaging device. The control instruction may be, for example, an instruction to control the zoom factor of the zoom lens of the imaging device 20, or may be an instruction to control the imaging range of the zoom lens of the imaging device 20, etc.

In the present disclosure, the description is made by taking the movable platform 10 as an unmanned aerial vehicle (UAV) as an example. The unmanned aerial vehicle may include various types of UAV 101, such as a quadrotor UAV, a hexarotor UAV, etc. The gimbal may be a three-axis gimbal. That is, the attitude of the gimbal may be controlled on the pitch axis, roll axis, and yaw axis, thereby determining the orientation of the gimbal, such that the imaging device 20 mounted on the gimbal can complete the corresponding imaging tasks.

In the present disclosure, the UAV may establish a communication connection with the control terminal 30 described above through a wireless connection method (e.g., a wireless connection method based on Wi-Fi or radio frequency communication, etc.), the control terminal 30 may be a controller with a rocker and a display screen, and the UAV may be controller by the amount of rocker displacement. The control terminal 30 may also be a smart device such as a smart phone, a tablet computer, etc., which can control the automatic flight of the UAV by configuring the flight trajectory on a user interface (UI), or control the automatic flight of the UAV by body sensing, or control the automatic flight of the UAV along a recorded flight trajectory after pre-recording the flight trajectory during the flight of the UAV.

In the present disclosure, the imaging device 20 may also establish a communication connection with the control terminal 30 described above through a wireless connection method (e.g., a wireless connection method based on Wi-Fi or radio frequency communication, etc.). An application software for controlling the imaging device 20 may be installed on the control terminal 30. The user may use the application software to view the captured image returned by the imaging device on the display interface of the control terminal 30, and the application software can also provide an interactive interface between the user and the control terminal 30 and the imaging device 20.

Next, in conjunction with the display interface of the control terminal, the display method provided in the present disclosure will be described from the following four aspects: 1. adjusting the definition of the details of the image; 2. selecting the detail imaging area; 3. shooting; and 4. viewing the imaging result.

1. Adjusting the definition of the details of the image.

Figure 2:
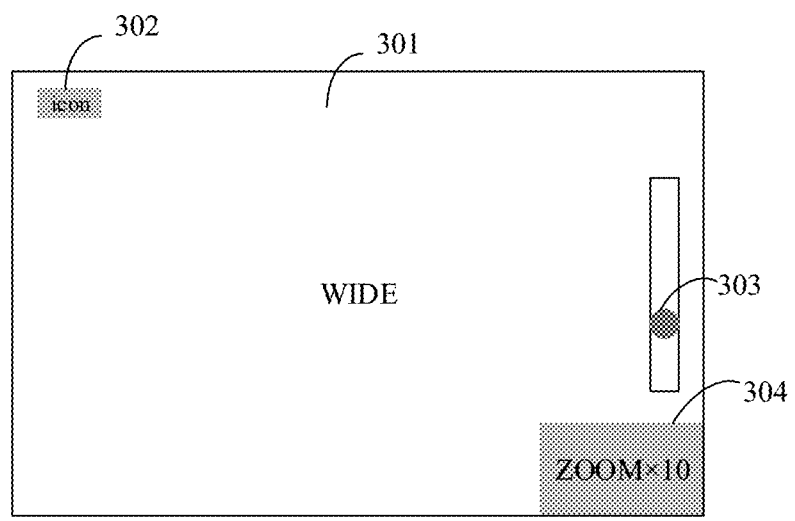
FIGS. 2-12 are schematic diagrams of to display interface of a control terminal according to an embodiment of the present disclosure.

FIG. 2 exemplarily illustrate the display interface of the control terminal 30.

As shown in FIG. 2, the display interface includes a display area 301, an ultra-resolution control 302, a zoom factor adjustment control 303, and a switching control 304. In some embodiments, the display area 301 may be used to display an image obtained by a wide-angle lens or a zoom lens. The display area 301 shown in FIG. 2 is displaying an image (WIDE) obtained by the wide-angle lens. The ultra-resolution control 302 may be used to enter an ultra-resolution imaging mode. The control terminal 30 may be configured to obtain a user operation (such as a clicking operation) acting on the ultra-resolution control 302, and in response to the user operation, the control terminal 30 may enter the ultra-resolution imaging mode. The zoom factor adjustment control 303 may be used to adjust the zoom factor of the zoom lens. The control terminal 30 may be configured to obtain a user operation (such as an upward sliding operation or a downward sliding operation) acting on the zoom factor adjustment control 303, and in response to the user operation, the imaging device 20 may adjust (e.g., increase or decrease) the zoom factor of the zoom lens.

The user operation is not limited to the upward sliding operation or the downward sliding operation. In specific implementation, the user operation may also be a left sliding operation, a right sliding operation, or a clicking operation, which is not limited in the present disclosure.

The switching control 304 may be used to switch the content being displayed in the display area 301, such as switching the image obtained by the wide-angle lens being displayed in the display area 301 to the image obtained by the zoom lens, or switch the image obtained by the zoom lens being displayed in the display area 301 to the image obtained by the wide-angle lens.

Next, the content currently being displayed in the display area 301 in the display interface as an image obtained by a wide-angle lens is taken as an example to describe the process of adjusting the definition of the details of the image.

First, the content being displayed in the display area 301 may need to be switched to the image obtained by the zoom lens, and then the zoom factor adjustment control 303 may need to be adjusted until the definition of the image obtained by the zoom lens meets the user's needs.

Figure 3:
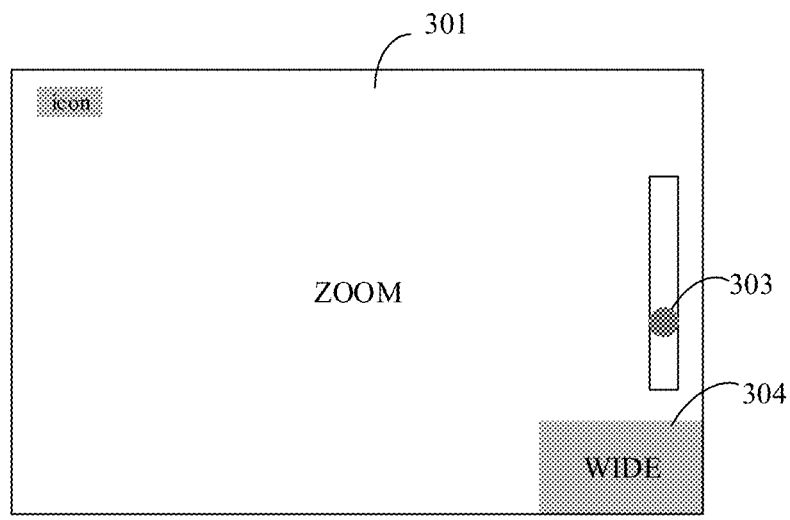

Specifically, the control terminal 30 may obtain a user operation (such as a clicking operation) acting on the switching control 304, and in response to the user operation, the control terminal 30 may switch the image (WIDE) obtained by the wide-angle lens displayed in the display area 301 to the image (ZOOM) obtained by the zoom lens shown in FIG. 3. At this time, the user can intuitively view the image obtained by the zoom lens, and adjust the zoom factor of the zoom lens by adjusting the zoom factor adjustment control 303 until the definition of the image obtained by the zoom lens meets the user's requirements.

Specifically, the control terminal 30 may obtain a user operation (such as an upward sliding operation or a downward sliding operation) acting on the zoom factor adjustment control 303, and in response to the user operation, the control terminal 30 may send an instruction to adjust the zoom factor to the imaging device 20. The instruction may carry information about the zoom factor, and the imaging device 20 may adjust the zoom factor of the zoom lens based on the instruction, and send the image obtained by the adjusted zoom lens to the control terminal 30. In this way, the control terminal 30 can display the image obtained by the zoom lens after the zoom factor adjustment in the display area 301 of the display interface in real time, until the definition of the image obtained by the zoom lens meets the user's requirements.

The adjustment of the zoom factor of the zoom lens is not limited to the zoom factor adjustment control 303. In some specific implementation, the zoom factor of the zoom lens may also be adjusted by adjusting a scroll wheel on the control terminal 30.

It should be understood that the higher the zoom factor, the higher the definition of the image obtained by the zoom lens; and the lower the zoom factor, the lower the definition of the image obtained by the zoom lens.

2. Selecting the detail imaging area.

After determining the zoom factor of the zoom lens, the user may click the switching control 304 again to cause the display area 301 in the display interface to switch the image (ZOOM) obtained by the zoom lens to the image obtained by the wide-angle lens (WIDE).

At this time, the control terminal 30 may obtain a user operation (such as a clicking operation) acting on the ultra-resolution control 302, and in response to the user operations, the control terminal 30 may enter the ultra-resolution imaging mode. Specifically, the display interface shown in FIG. 4 can be displayed.

That is, in response to the user operation acting on the ultra-resolution control 302, the control terminal 30 may display a first detail imaging area 305 in the display interface. The first detail imaging area 305 may be used to display the imaging range of the zoom lens. At this time, the position of the first detail imaging area 305 in the display interface may be determined by an initial direction of the zoom lens. The user may select the detail imaging area that needs to be captured by the zoom lens by adjusting the first detail imaging area 305.

Figure 4:
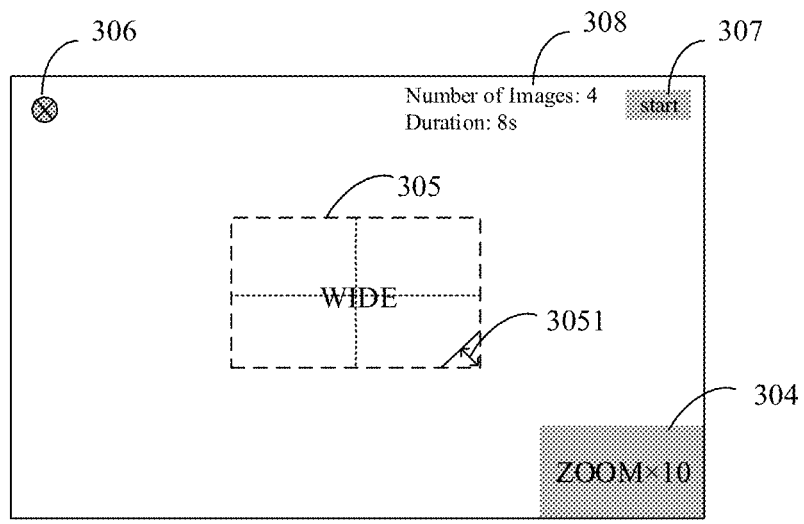

Specifically, as shown in FIG. 4, the first detail imaging area 305 includes an adjustment control 3051, and the adjustment control 3051 may be used to adjust the size of the first detail imaging area 305. For example, the user may input a sliding operation towards the upper-left corner of the display interface after pressing the adjustment control 3051 to reduce the size of the first detail imaging area 305. The user may also input sliding operation towards the lower-right corner of the display interface after pressing the first detail imaging area 305 to increase the size of the first detail imaging area 305.

In addition, the user may also adjust the position of the first detail imaging area 305 by dragging the first detail imaging area 305.

Figure 5:
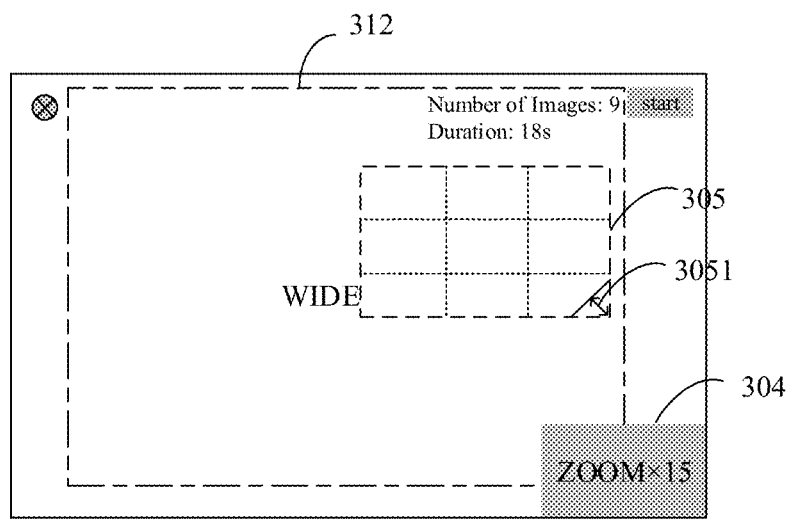

Specifically, when the user drags the first detail imaging area 305, the control terminal 30 may display a maximum adjustment range 312 as shown in FIG. 5 on the display interface to prompt the user that the first detail imaging area 305 cannot be moved out of the maximum adjustment range 312. In some embodiments, the maximum adjustment range 312 may be the maximum imaging range of the zoom lens, and the maximum adjustment range 312 may be determined by a maximum rotation angle of the gimbal.

Possibly, the control terminal 30 may determine whether the user's adjustment of the first detail imaging area 305 exceeds the maximum adjustment range 312 described above, and if so, a prompt message may be output. The adjustment of the first detail imaging area 305 described above may include adjusting the position, or size, or size and position of the first detail imaging area 305. The prompt message described above may be, for example, at least one of text information, vibration information, flashing light prompt information, or sound prompt information. The prompt information may be used to prompt that the current adjustment of the first detail imaging area 305 exceeds the maximum adjustment range.

The display of the maximum adjustment range is not limited to when dragging the first detail imaging area 305. In some possible embodiments, after entering the ultra-resolution mode, that is, after the user clicks the ultra-resolution control 302, the control terminal 30 may display the maximum adjustment range 312 on the display interface.

Causing the control terminal 30 to display of the first detail imaging area 305 is not limited to clicking on the ultra-resolution control 302. In a specific implementation, the user may manually select an area in the display interface to make the control terminal 30 determine that the area is the first detail imaging area and display it, which is not limited in the present disclosure.

It should be understood that the first detail imaging area 305 may include one or more sub-areas, and the number of the sub-areas may represent the number of images that the zoom lens needs to capture. When the size of the of the imaging area is the same, the larger the zoom factor of the zoom lens, the more images the zoom lens needs to capture. As shown in FIG. 4, when the zoom factor of the zoom lens is 10, the number of sub-areas is 4, that is, the number of images that the zoom lens needs to capture is 4. As shown in FIG. 5, when the zoom factor of the zoom lens is 15, the number of sub-areas is 9, that is, the number of images that the zoom lens needs to capture is 9.

The user may adjust the zoom factor at this time, and an increase of the zoom factor may cause the maximum adjustment range 312 to decrease. When the maximum adjustment range 312 is reduced to affect the first detail imaging area 305, the maximum adjustment range 312 and the first detail imaging area 305 may be reduced in the display interface at the same time, and the first detail imaging area 305 may be kept within the maximum adjustment range 312 at all times.

Figure 6:
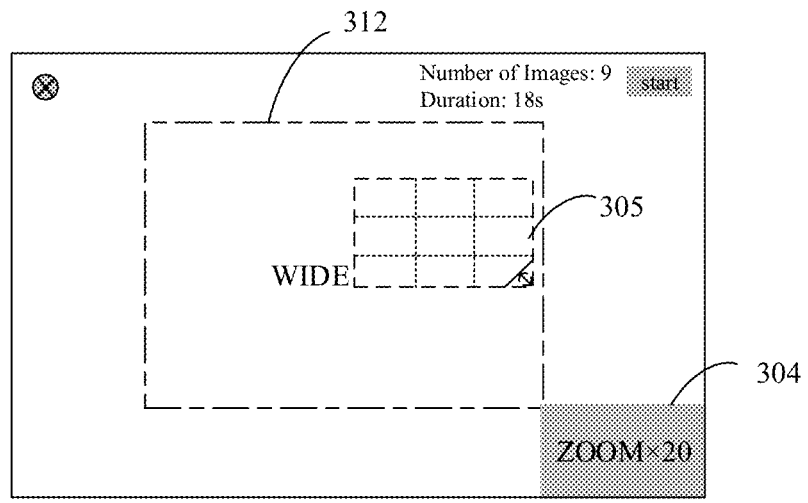

Comparing FIG. 5 and FIG. 6, it can be seen that when the zoom factor is adjusted from 15 to 20, the maximum adjustment range 312 is reduced, the first detail imaging area 305 is also reduced at the same time, and the first detail imaging area 305 is always within the maximum adjustment range 312. This is caused by the maximum rotation angle of the gimbal. When the maximum rotation angle of the gimbal is fixed, the larger the zoom factor of the zoom lens, the smaller the focus range of the zoom lens may be in a single shot. As a result, the zoom lens can capture a smaller range under the drive of the gimbal, which can be reflected in the size of the maximum adjustment range 312.

3. Shooting.

Referring to FIG. 4. In addition to the first detail imaging area 305, the display interface also includes an exit control 306, an imaging control 307, and shooting information 308. In some embodiments, the exit control 306 may be used to exit the ultra-resolution imaging mode. The control terminal 30 may obtain a user operation (such as a clicking operation) acting on the exit control 306, and in response to the user operation, the control terminal 30 may exit the ultra-resolution imaging mode and display the display interface shown in FIG. 2. The imaging control 307 may be used to start capturing an image. The control terminal 30 may obtain a user operation (such as a clicking operation) acting on the imaging control 307, and in response to the user operation, the control terminal 30 may start capturing an image. The shooting information 308 may be used to indicate the shooting information, such as the number of images of the zoom lens and the shooting duration, etc. For example, as shown in FIG. 4, the number of images of the zoom lens is 4, and the shooting duration of the zoom lens is 8 seconds.

Possibly, the control terminal 30 may obtain a user operation (such as a clicking operation) acting on the imaging control 307, and in response to the user operation, the control terminal 30 may detect whether an imaging condition is current met. When the imaging condition is met, the shooting may start.

Specifically, the imaging condition may be, for example, that the power of the UAV is sufficient, the wind in the current imaging environment does not exceed a threshold, etc. In some embodiments, the whether the UAV's battery is sufficient may depend on the duration of the shoot. Further, the wind force in the current imaging environment may not exceed the threshold to ensure that the UAV can fly steadily, thereby ensuring the quality of the images captured by the imaging device 20.

Figure 7:
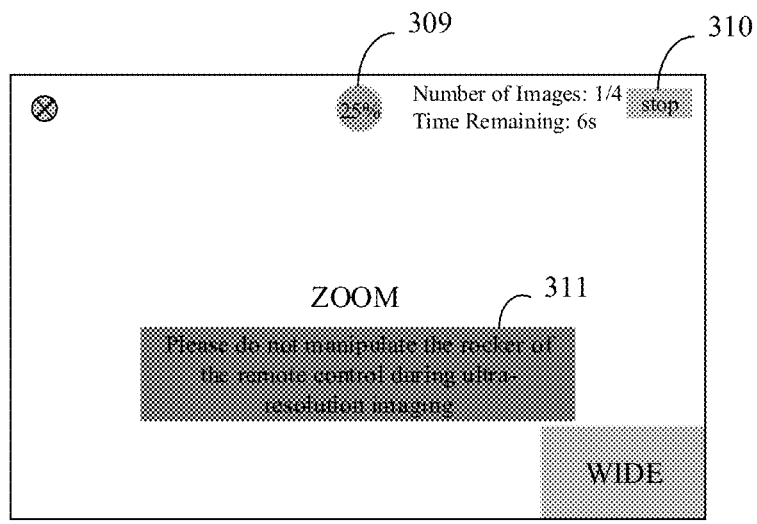

After the control terminal 30 starts to capture images, it may automatically switch the display content of the display area 301 to the image (ZOOM) obtained by a zoom lens, as shown in FIG. 7. In this way, the user can intuitively view the detailed image captured by the zoom lens, check whether the zoom lens has a clear focus, and whether the image obtained by the zoom lens is blurred.

In addition, after the control terminal 30 starts to capture images, the control terminal 30 may also display an imaging progress 309, a stop control 310, and a prompt box 311 on the display interface. In some embodiments, the imaging progress 309 may be used to indicate the current imaging progress, such as 25%. The stop control 310 may be used to stop the current ultra-resolution imaging process. The control terminal 30 may obtain a user operation (such as a clicking operation) acting on the display area 301, and in response to the user operation, the control terminal 30 may stop the current imaging process. The prompt box 311 may be used to remind the user that analysis and shooting are currently underway, and please do not manipulate the rocker of the remote control, etc., to ensure the smooth flight of the UAV, thereby ensuring the quality of the images obtained by the imaging device.

After the user switches the display content of the display area 301 to the image (WIDE) obtained by the wide-angle lens, the control terminal 30 may mark the area currently being imaged on the display interface.

Figure 8:
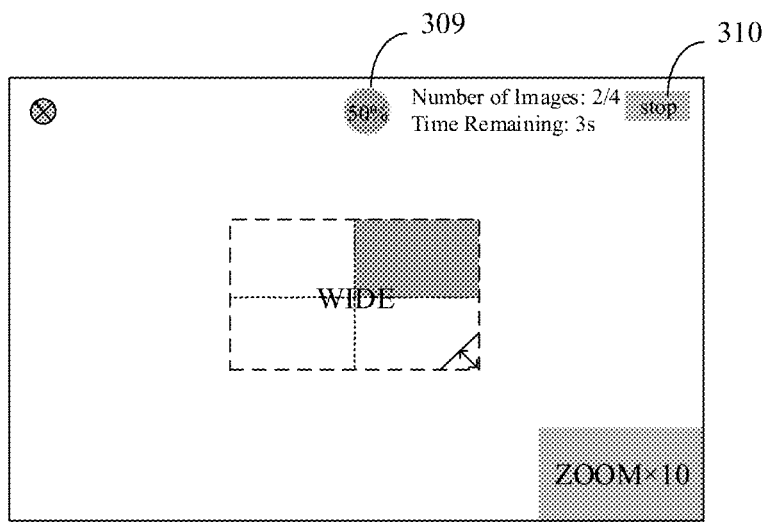

Specifically, the first detail imaging area 305 may include one or more sub-areas, and these sub-areas may be arranged in a preset order. The preset order may be from left to right, and from top to bottom. The control terminal 30 may sequentially mark the area currently being imaged based on the preset order described above during the process of capturing the image by the zoom lens. As shown in FIG. 8, the second area is currently being imaged, and the control terminal 30 may mark this area. The method of marking the area may be at least one of increasing the display, increasing the display border, increasing the display mark, using a special display color, or using a special transparent display.

Figure 9:
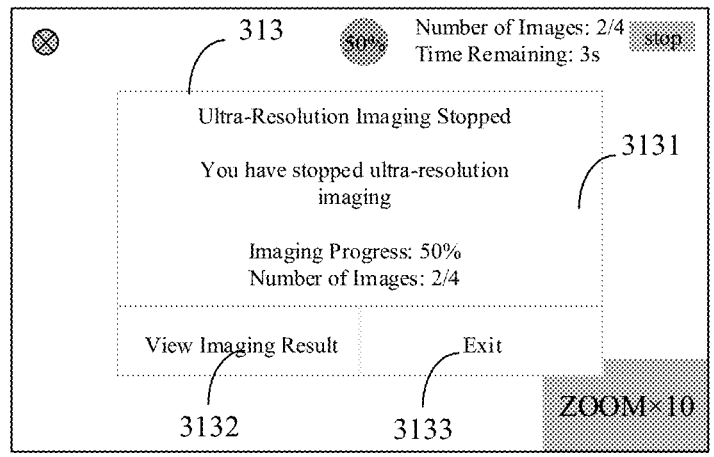

In the imaging process, when an abnormal situation occurs and the imaging is interrupted, the control terminal 30 may display a prompt box 313 as shown in FIG. 9 on the display interface. As shown in FIG. 9, the prompt box 313 includes an information display area 3131, a view control 3132, and an exit control 3133. In some embodiments, the information display area 3131 may be used to display the reason for the interruption of imaging (such as "you have stopped ultra-resolution imaging"), imaging progress (such as 50%), and the number of captured images (such as 2/4, which indicates that the total number of images to be captured is 4, and currently 2 images have been captured). The view control 3132 may be used to view the imaging result. The control terminal 30 may detect a user operation (such as a clicking operation) acting on the view control 3132, and in response of the user operation, the control terminal 30 may display the imaging result on the display interface. The exit control 3133 may be used to exit the current imaging. The control terminal 30 may detect a user operation (such as a clicking operation) acting on the exit control 3133, and in response of the user operation, the control terminal 30 may exit the current imaging and display the display interface shown in FIG. 2.

The abnormal situation described above may be, but is not limited to, that the user clicks on the stop control 310, the rocker of the remote control is moved, the wind in the current flight environment is too strong, the current remaining power of the UAV is insufficient, etc.

Figure 10:
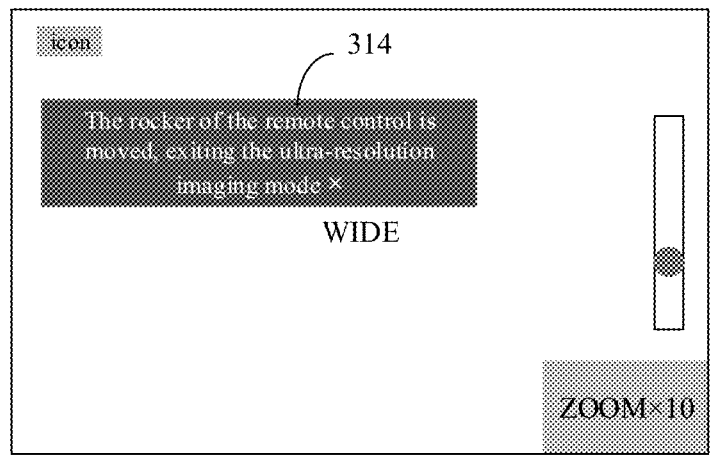

Possibly, after the imaging is interrupted due to abnormal situations, the control terminal 30 may also display a prompt box 314 shown in FIG. 10 on the display interface after exiting the current imaging to remind the user of the reason for the abnormal exit, such as "exiting the ultra-resolution imaging mode as the rocker of the remote control is moved."

4. Viewing the imaging result.

Figure 11:
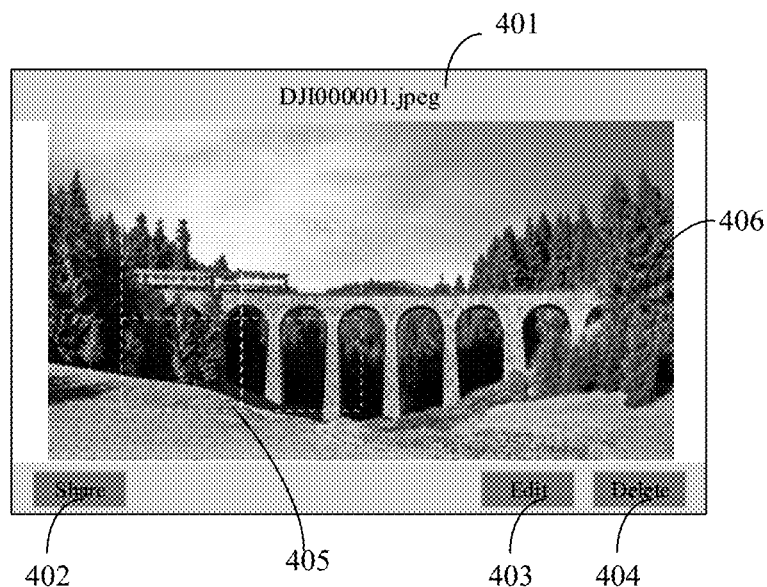

After the imaging is complete, the user may view the imaging result on the control terminal 30. FIG. 11 is an example of an imaging result.

As shown in FIG. 11, the display interface includes an image name indicator 401, a sharing control 402, an editing control 403, a deletion control 404, a first detail shooting area 405, and a content display area 406. In some embodiments, the image name indicator 401 may be used to indicate the name of the image, and the name of the image as shown in FIG. 11 is DJI000001. Further, the image name indicator 401 may also be used to indicate the format of the image. As shown in FIG. 11, the format of the image is .jpeg. The sharing control 402 may be used to share the image to other devices. The editing control 403 may be used to edit the image, such as cropping, rotating, adding filters, adding marks, etc. The deletion control 404 may be used to delete the image. Specifically, the image may be stored in the memory of the control terminal 30, and the deletion control 404 may be used to delete the image from the memory of the control terminal 30. The first detail shooting area 405 may be used to indicate the position of the first detail shooting area, that is, the position of the image obtained by the zoom lens in the image obtained by the wide-angle lens. The content display area 406 may be used to display the image obtained by the wide-angle lens.

The user may use the images obtained by the wide-angle lens as an index to view the images obtained by the zoom lens. The position of the image obtained by the zoom lens in the image obtained by the wide-angle lens may be notified to the user through the first detail shooting area 405.

Specifically, the first detail shooting area 405 may include one or more sub-areas that correspond to one or more sub-areas included in the first detail shooting area when the detail shooting area in the second part is selected.

The control terminal 30 may detect a user operation acting on any sub-area in the first detail shooting area (such as a clicking operation acting on a first sub-area (that is, the upper left corner)). In response to the user operation, the control terminal 30 may display the detailed view of the sub-area shown in FIG. 12 on the display interface.

Figure 12:
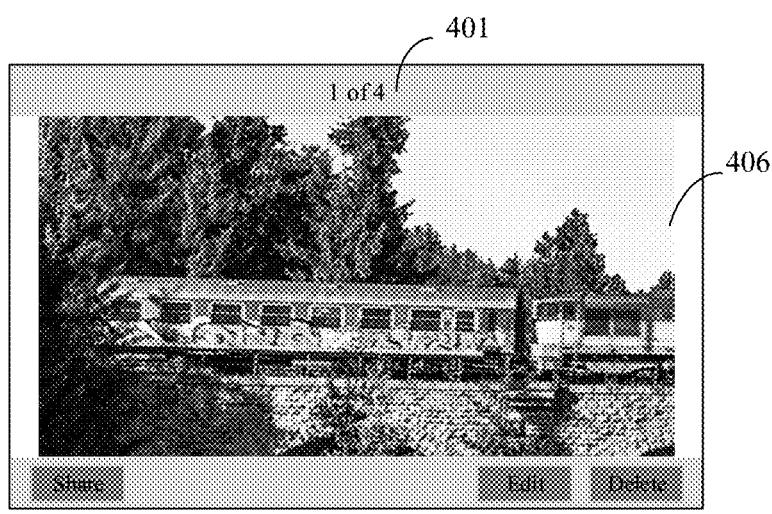

As shown in FIG. 12, the image name indicator 401 is used to indicate the sequence number of the detail image of the currently viewed sub-area in the first detail shooting area, such as 1 of 4, indicating that the first detail shooting area includes four sub-areas, and the detail image of the first sub-area is currently being viewed.

The content display area 406 may be used to display a detailed image of the sub-area.

The user may also input a sliding operation in the content display area 406 to view the detailed image of the sub-area adjacent to the sub-area.

For example, the control terminal 30 may acquire a left sliding operation acting on the content display area 406 in FIG. 12. In response to the left sliding operation, the control terminal 30 may display the detailed image corresponding to the second sub-area (that is, the sub-area in the upper right corner of the first detail shooting area in FIG. 11).

In another example, the control terminal 30 may acquire a slide up operation acting on the content display area 406 in FIG. 12. In response to the slide up operation, the control terminal 30 may display the detailed image corresponding to the second sub-area (that is, the sub-area in the lower left corner of the first detail shooting area in FIG. 11).

The user operation is not limited to the left sliding operation or the slide up operation described above. In specific implementations, a clicking operation or a long press operation on different areas of the second imaging result of a certain sub-area may be used to view the detailed image of the sub-area adjacent to the sub-area, which is not limited in the present disclosure.

Through the process of viewing the imaging result described above, the user can use the image obtained by the wide-angle lens as an index, locate the detailed image of any sub-area obtained by the zoom lens through a dotted frame, and directly switch to another detailed image from one detailed image, thereby reducing user operations and improving the efficiency of the user viewing the imaging results.

Next, in conjunction with the display interface of the control terminal 30 shown in FIG. 2 to FIG. 12, a display method provided by an embodiment of the present disclosure will be described. The display method can be applied to the control terminal 30.

Figure 13:
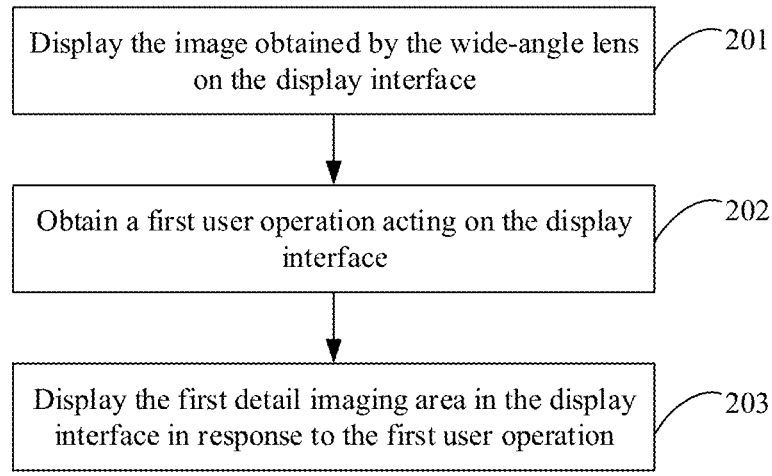
FIG. 13 is a flowchart of a display method according to an embodiment of the present disclosure.

As shown in FIG. 13, the display method includes the following processes.

S201, displaying the image obtained by the wide-angle lens in the display interface.

Specifically, reference can be made to FIG. 2 for the image obtained by the wide-angle lens being displayed in the display interface.

S202, obtaining a first user operation acting on the display interface.

Specifically, the first user operation may be a clicking operation on the ultra-resolution control 302. Or, the first user operation may be an operation of the user manually selecting a certain area in the display interface.

S203, displaying the first detail imaging area in the display interface in response to the first user operation.

In some embodiments, the first detail imaging area may be used to display the imaging range of the zoom lens. For the first detail imaging area, reference can be made to the first detail imaging area 305 shown in FIG. 4.

The embodiment of the present disclosure can be used to intuitively display the imaging range of the zoom lens in the display interface of the control terminal for the user to view, thereby enhancing the interest of the interaction between the user and the control terminal and the imaging device, and enhancing the user experience.

In some possible embodiments, in response to the first user operation described above, the control terminal 30 may also display the number of images and/or the imaging duration of the zoom lens on the display interface, such as the shooting information 308 shown in FIG. 4.

The embodiment of the present disclosure can be used to intuitively display the imaging parameters of the zoom lens in the display interface of the control terminal for the user to view, such that the user is aware of the time required for capturing images or the number of images to be captured in advance, thereby improving the user experience.

In some embodiments, a third user operation acting on the zoom factor adjustment control 303 may be obtained to adjust the zoom factor of the zoom lens, such that the user can adjust/modify the zoom factor before zooming and capturing images. Of course, the method of adjusting the zoom factor of the zoom lens is not limited to adjusting the zoom factor of the zoom lens through the zoom factor adjustment control 303. In some specific implementations, the zoom factor of the zoom lens may also be adjusted by adjusting the scroll wheel on the control terminal 30.

In some possible embodiments, in response to the third user operation described above, the imaging area division result of the first detail imaging area may be updated, and the shooting information of the zoom lens may be displayed on the display interface. The shooting information may include at least one of the number of images to be captured or the imaging duration. When the zoom factor changes, the imaging parameters of the wide-angle lens may also change accordingly, realizing the linkage of lens parameters. In this way, the user can directly understand the time required or the number of images to be captured for the currently set zoom imaging, thereby improving the user experience.

In some possible embodiments, the display interface shown in FIG. 2 may include a switching control 304. After the process at S201, the display method may further include the following processes.

S204, obtaining a second user operation acting on the switching control.

S205, switching the image being displayed in the display interface to the image obtained by the zoom lens in response to the second user operation.

Specifically, the second user operation may be a clicking operation acting on the switching control 304. It can be seen that the content currently being displayed on the display interface shown in FIG. 2 is an image (WIDE) obtained by a wide-angle lens. After the control terminal 30 obtains the clicking operation acting on the switching control 304, in response to the clicking operation, the control terminal 30 may display an image (ZOOM) obtained by a zoom lens as shown in FIG. 3 in in the display area 301, thereby realizing the control and display of imaging with the wide-angle lens and the zoom lens on the same display interface.

In some possible embodiments, the display interface shown in FIG. 3 may include a zoom factor adjustment control 303. After the process at S205, the display method may further include the following processes.

S206, obtaining a third user operation acting on the zoom factor adjustment control.

S207, updating and displaying the image obtained by the zoom lens in response to the third user operation.

Specifically, the third user operation may be a user operation (such as an upward sliding operation or a downward sliding operation) that acts on the zoom factor adjustment control 303 described in the embodiment of FIG. 3.

In some embodiments, when the zoom factor changes, the parameters being displayed on the wide-angle lens screen may change accordingly. Changes in the parameters being displayed on the wide-angle lens screen may include a change of the dotted frame showing the image based on the calculation result of an algorithm, a change of the number of images to be captured for the ultra-resolution imaging, and a change of the imaging duration required. The changes described above can be used to remind the user that the change in the zoom factor of the zoom lens has affected the ultra-resolution imaging parameters.

The user operation is not limited to the upward sliding operation or the downward sliding down operation. In specific implementation, the third user operation may also be a left sliding operation, a right sliding operation, or a clicking operation, which is not limited in the present disclosure.

Specifically, the zoom factor adjustment control 303 may be used to adjust the zoom factor of the zoom lens. The resolution of the image obtained by the zoom lens before the update and display may be determined by the zoom factor before adjustment, and the resolution of the image obtained by the zoom lens after the update and display may be determined by the adjusted zoom factor.

It should be understood that the higher the zoom factor, the higher the definition of the image obtained by the zoom lens; and the lower the zoom factor, the lower the definition of the image obtained by the zoom lens.

The method of adjusting the zoom factor of the zoom lens is not limited to adjusting the zoom factor of the zoom lens through the zoom factor adjustment control 303. In some specific implementations, the zoom factor of the zoom lens may also be adjusted by adjusting the scroll wheel on the control terminal 30.

In the embodiments of the present disclosure, the user can adjust the zoom factor of the zoom lens through the control terminal. When the zoom factor changes, the imaging parameters of the wide-angle lens may also change accordingly, realizing the linkage of lens parameters. The user can check whether the sharpness of the image obtained by the zoom lens meets the user's need in real time in the display interface of the control terminal, thereby enhancing the user's control over the zoom lens, enabling the user to increase the intuitive and clear control of the zoom lens, increasing the accuracy of the imaging results, and enhancing the user's experience in the imaging process.

In some possible embodiments, the display interface shown in FIG. 4 may also include an imaging control 307. The first detail imaging area 305 may include one or more sub-areas, and the number of the sub-areas may be determined by the zoom factor of the zoom lens. The one or more sub-areas described above may be arranged in a preset order. After the process at S203, the display method may further include the following processes.

S208, obtaining a fourth user operation acting on the shooting control.

S209, marking the sub-areas in a preset order to indicate the current shooting progress in response to the fourth user operation.

Specifically, the fourth user operation may be a user operation that acts on the imaging control 307, and the user operation may be a clicking operation.

Specifically, the preset order described above may be from left to right, and from top to bottom. The control terminal 30 may sequentially mark the area currently being imaged based on the preset order described above during the process of capturing the image by the zoom lens. The marking method may be at least one of increasing the display, increasing the display border, increasing the display mark, using a special display color, or using a special transparent display. As shown in FIG. 8, the currently marked sub-area is the second sub-area (that is, the upper right sub-area), which means that the zoom lens is currently shooting a detailed image corresponding to the second sub-area.

In the embodiments of the present disclosure, the control terminal can display the current imaging progress in real time, intuitively let the user understand the current imaging progress, thereby improving the user's experience in the imaging process.

In some other possible embodiments, after the process at S208, the display method may further include the following process.

S210, in response to the fourth user operation, displaying an abnormal prompt information in the display interface, the abnormal prompt information being used to prompt the user that the current imaging is abnormally terminated.

Specifically, in the imaging process, when an abnormal situation occurs and the imaging is interrupted, the control terminal 30 may display a prompt box 313 as shown in FIG. 9 on the display interface. The information in the prompt box 313 may be the abnormal prompt information, which can be used to prompt the user that the current imaging is abnormally terminated.

In the embodiments of the present disclosure, when the imaging process is abnormally terminated, the control terminal can display the reason for the abnormal imaging termination, such that the user can check and sort out the reason, and avoid such situation from recurring in the next imaging process.

In some other possible embodiments, after the process at S209, the display method may further include the following processes.

S211, displaying a first imaging result in the display interface, the first imaging result including the first detail shooting area.

S212, obtaining a fifth user operation acting on the first sub-area.

S213, displaying a second imaging result corresponding to the first sub-area in response to the fifth user operation.

Specifically, for the display of the first imaging result in the display interface, reference can be made to FIG. 11. The first imaging result may be the image obtained by the wide-angle lens, that is, the content being displayed in the content display area 406 in FIG. 11. The display interface shown in FIG. 11 may include a first detail shooting area 405, that is, the dotted frame in FIG. 11.

Specifically, the first sub-area may be any one of the one or more sub-areas included in the first detail imaging area, and the fifth user operation may be a clicking operation on the first sub-area.

Specifically, for the display of the second imaging result in the display interface, reference can be made to FIG. 12. In FIG. 12, the first sub-area is taken as the upper left sub-area as an example. The second imaging result may be the detailed image corresponding to the first sub-area, and the detailed image may be the image obtained by the zoom lens. It can be seen that the resolution of the second imaging result is higher than the resolution of the first imaging result.

In the embodiments of the present disclosure, the user can use the image obtained by the wide-angle lens as an index, and quickly locate the detailed image of any sub-area obtained by the zoom lens through the dotted frame, thereby improving the efficiency of the user to view the imaging result.

In some other possible embodiments, after the process at S213, the display method may further include the following processes.

S214, obtaining a sixth user operation acting on the first sub-area.

S215, displaying the second imaging result corresponding to the adjacent sub-area of the first sub-area on the display interface in response to the sixth user operation, the adjacent sub-area being a sub-area of the plurality of sub-areas described above.

Specifically, the sixth user operation may be a sliding operation (such as a left sliding operation, a right sliding operation, an upward sliding operation, or a downward sliding operation) acting on the first sub-area.

When the sixth user operation is a left sliding operation acting on the first sub-area, in response to the sixth user operation, the control terminal 30 may display the second imaging result corresponding to the adjacent sub-area to the right of the first sub-area on the display interface.

When the sixth user operation is a right sliding operation acting on the first sub-area, in response to the sixth user operation, the control terminal 30 may display the second imaging result corresponding to the adjacent sub-area to the left of the first sub-area on the display interface.

When the sixth user operation is an upward sliding operation acting on the first sub-area, in response to the sixth user operation, the control terminal 30 may display the second imaging result corresponding to the adjacent sub-area below the first sub-area on the display interface.

When the sixth user operation is a downward sliding operation acting on the first sub-area, in response to the sixth user operation, the control terminal 30 may display the second imaging result corresponding to the adjacent sub-area above the first sub-area on the display interface.

The sixth user operation is not limited to the sliding operations described above, and the sixth user operation may also be a clicking operation or the long press operation on a different area of the second imaging result of the first sub-area. For example, the sixth user operation may be a clicking operation on the left area of the second imaging result of the first sub-area. In response to the sixth user operation, the control terminal 30 may display the second imaging result corresponding to the adjacent sub-area to the left of the first sub-area on the display interface.

In the embodiments of the present disclosure, the user can directly switch to another detailed image from a certain detailed image, thereby reducing user operations and improving the efficiency of the user viewing the imaging results.

In some other possible embodiments, the imaging angle of the first sub-area and the imaging angle of the adjacent sub-area may be calculated by the imaging device. That is, the imaging angle of each sub-area in the first detail imaging area may be calculated by the imaging device.

In some other possible embodiments, after the process at S202, the display method may further include the following process.

S216, displaying the maximum adjustment range of the first detail imaging area on the display interface.

Specifically, for the maximum adjustment range, reference can be made to the maximum adjustment range 312 shown in FIG. 5. The maximum adjustment range 312 may be a maximum imaging range of the zoom lens. The user may intuitively understand the range of the image that the zoom lens can obtain from the display interface. The maximum adjustment range 312 may be determined by the maximum rotation angle of the gimbal.

In some other possible embodiments, after the process at S216, the display method may further include the following processes.

S217, obtaining a seventh user operation for adjusting the size and/or position of the first detail imaging area.

S218, determining whether the adjustment of the size and/or position of the first detail imaging area by the seventh user operation exceeds the maximum adjustment range of the first detail imaging area.

S219, output a prompt information if the adjustment of the size and/or position of the first detail imaging area by the seventh user operation exceeds the maximum adjustment range of the first detail imaging area.

Specifically, the prompt information may be used to indicate that the adjustment of the size and/or position of the first detail imaging area by the seventh user operation exceeds the maximum adjustment range of the first detail imaging area.

Specifically, the seventh user operation may be a user operation acting on the adjustment control 3051 shown in FIG. 5, and the seventh user operation may be used to adjust the size of the first detail imaging area. For example, the user operation may be pressing the adjustment control 3051 and then inputting a left-upward sliding operation, which may be used to reduce the size of the first detail imaging area 305. In another example, the user operation may be pressing the adjustment control 3051 and then inputting a right-downward sliding operation, which may be used to increase the size of the first detail imaging area 305.

Specifically, the seventh user operation may be a dragging operation acting on the first detail imaging area 305 shown in FIG. 5 to adjust the position of the first detail imaging area 305.

Specifically, when the adjustment of the size and/or position of the first detail imaging area by the seventh user operation exceeds the maximum adjustment range 312 described above, the control terminal 30 may output the prompt information for prompting the user that the current adjustment of the first detail imaging area 305 exceeds the maximum adjustment range.

In some other possible embodiments, after the process at S203, the display method may further include the following processes.

S220, obtaining an eighth user operation for adjusting the size and/or position of the first detail imaging area.

S221, displaying the maximum adjustment range of the first detail imaging area on the display interface in response to the eighth user operation.

Specifically, the eighth user operation may be used to adjust the size and position of the first detail imaging area. For the specific description of the eighth user operation, reference can be made to the description of the seventh user operation in the foregoing embodiment, which will not be repeated here.

Specifically, when the user adjusts the size and/or position of the first detail imaging area, the control terminal 30 may display the maximum adjustment range 312 on the display interface. The user can intuitively understand the range of the image that the zoom lens can obtain from the display interface.

In some other possible embodiments, after the process at S221, the display method may further include the following processes.

S222, determining whether the adjustment of the size and/or position of the first detail imaging area by the eighth user operation exceeds the maximum adjustment range of the first detail imaging area.

S223, outputting the prompt information if the adjustment of the size and/or position of the first detail imaging area by the eighth user operation exceeds the maximum adjustment range of the first detail imaging area.

Specifically, the prompt information may be used to indicate that the adjustment of the size and/or position of the first detail imaging area by the eighth user operation exceeds the maximum adjustment range of the first detail imaging area.

Specifically, when the adjustment of the size and/or position of the first detail imaging area by the eighth user operation exceeds the maximum adjustment range 312 described above, the control terminal 30 may output the prompt information for prompting the user that the current adjustment of the first detail imaging area 305 exceeds the maximum adjustment range.

The embodiments of the present disclosure can prompt the user of the range that the zoom lens can shoot by displaying the maximum adjustment range in the display interface, such that the user can intuitively understand the range of the image that the zoom lens can obtain from the display interface. In addition, when the user adjusts the size and/or position of the first detail imaging area beyond the maximum adjustment range, the display interface can display the prompt information to remind the user. The control terminal can enhance the interaction with the user through the display interface, and intuitively display the relevant parameters of the imaging device to the user, thereby enhancing the user experience in the imaging process.

Figure 14:
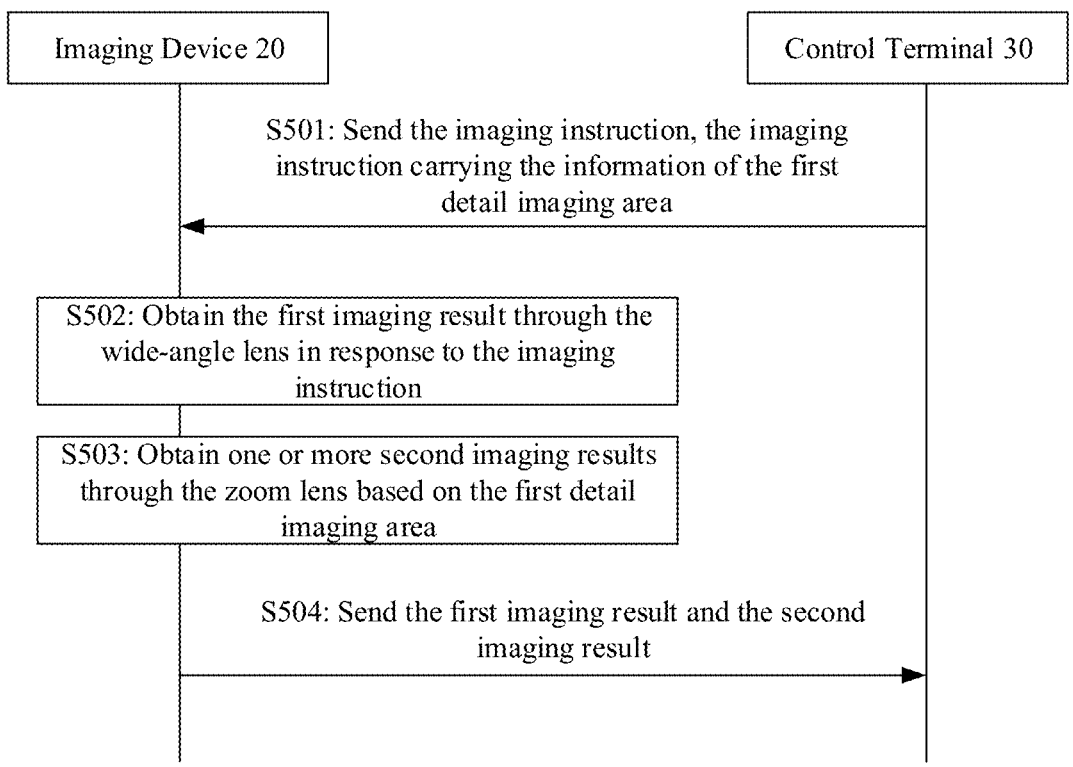
FIG. 14 is a flowchart of an imaging method according to an embodiment of the present disclosure.

FIG. 14 exemplarily illustrates an imaging method provided by an embodiment of the present disclosure. As shown in FIG. 14, the imaging method includes the following processes.

S501, the control terminal 30 sends an imaging instruction to the imaging device 20, the imaging instruction carrying the information of the first detail imaging area.

Specifically, the imaging instruction may be triggered by the user clicking the imaging control 307 in FIG. 4. The control terminal 30 may obtain a user operation (such as a clicking operation) acting on the imaging control 307, and in response to the user operation, the control terminal 30 may send an imaging instruction to the imaging device 20. The imaging instruction may carry the information of the first detail imaging area, such that the imaging device 20 can determine the imaging range of its zoom lens.

S502, the imaging device 20 obtains the first imaging result through the wide-angle lens in response to the imaging instruction.

S503, the imaging device 20 obtains one or more second imaging results through the zoom lens based on the first detail imaging area.

Specifically, the imaging device 20 may determine the width X and height Y of the area to be imaged by the zoom lens based on the information of the first detail imaging area. At the same time, the imaging device 20 may calculate the width x and height y of the image area to be shot by the zoom lens in a single shot based on the zoom factor N of the zoom lens. Based on X, x, and the overlap rate, the number of images M1 that need to be captured in the horizontal direction may be calculated, and based on Y, y, and the overlap rate, the number of images M2 that need to be captured in the vertical direction may be calculated. The product of M1 and M2 may be the number of images that the zoom lens needs to capture. In some embodiments, the overlap rate may be a ratio of the overlapping part of two adjacent images to the entire image. The overlap rate may be determined by the angle of each rotation of the gimbal during shooting. The angle of each rotation of the gimbal during the imaging process may be calculated by the imaging device 20.

Specifically, the first detail imaging area may include one or more sub-areas. The number of sub-areas included in the first detail imaging area may be the number of images that need to be taken by the zoom lens calculated by the imaging device 20 described above.

Specifically, each second imaging result may correspond to a sub-area, the imaging angle of each second imaging result may be calculated by the imaging device 20, and the resolution of the second imaging result may be higher than the resolution of the first imaging result.

S504, the imaging device 20 sends the first imaging result and the second imaging result to the control terminal 30.

In the embodiments of the present disclosure, the angle of the zoom lens during each shooting can be calculated by the imaging device 20, and the angle of the zoom lens can be accurately positioned by the gimbal without manual adjustment of the imaging angle and stitching. The use of the embodiments of the present disclosure can improve the accuracy of the imaging result and improve the efficiency of imaging.

In some possible embodiments, the control terminal 30 may include a display interface. Before the process at S501, the imaging method may further include the following processes.

S505, receiving an instruction to adjust the zoom factor of the zoom lens sent by the control terminal 30. In some embodiments, the instruction to adjust the zoom factor of the zoom lens may be detected by the zoom factor adjustment control, which may be a control in the display interface.

Specifically, for the zoom factor adjustment control, reference can be made to the zoom factor adjustment control 303 shown in FIG. 2 or FIG. 3. The user may input an instruction to adjust the zoom factor of the zoom lens by adjusting the zoom factor adjustment control 303. The control terminal 30 may send the instruction to the imaging device 20 in real time. This instruction may carry information about the zoom factor of the zoom lens.

S506, adjusting the zoom factor of the zoom lens based on the instruction to adjust the zoom factor of the zoom lens.

Specifically, after the imaging device 20 obtains the instruction carrying the information of the zoom factor of the zoom lens, it may adjust the zoom factor of the zoom lens based on the zoom factor indicated by the instruction.

S507, obtaining the imaging screen through the zoom lens, and sending the imaging screen to the control terminal 30 such that the control terminal 30 can update and display the image obtained by the zoom lens in the display interface.

Specifically, after adjusting the zoom factor, the zoom lens may obtain the imaging screen based on the zoom factor, and the imaging device 20 may send the imaging screen obtained by the zoom lens to the control terminal 30 in real time, such that the control terminal 30 can display the image obtained by the zoom lens, and the user can intuitively check whether the sharpness of the image obtained by the zoom lens meets the user's needs.

Specifically, the zoom factor adjustment control may be used to adjust the zoom factor of the zoom lens. The resolution of the image obtained by the zoom lens before the update and display may be determined by the zoom factor before adjustment, and the resolution of the image obtained by the zoom lens after the update and display may be determined by the adjusted zoom factor.

In some possible embodiments, the display interface may also include a switching control. The switching control may be the switching control 304 shown in FIG. 3, and the switching control 304 may be used to switch the image (ZOOM) obtained by the zoom lens being displayed in the display interface to the image (WIDE) obtained by the wide-angle lens.

In some possible embodiments, the display interface may also include a first detail imaging area. The first detail imaging area may be obtained based on the first user operation acting on the display interface, and the first detail imaging area may be used to display the imaging range of the zoom lens.

Specifically, the first detail imaging area may be the first detail imaging area 305 shown in FIG. 4. The first user operation may be a clicking operation on the ultra-resolution control 302. Or, the first user operation may be an operation of the user manually selecting a certain area in the display interface. For details, reference can be made to the description of S202, which will not be repeated here.

In some possible embodiments, the display interface may also include the number of images to be captured and/or the imaging duration of the zoom lens. For details, reference can be made to the shooting information 308 shown in FIG. 4. The shooting information 308 may change as the imaging parameters of the zoom lens change. As a result, the imaging parameters of the wide-angle lens may change accordingly, and the lens parameters may change accordingly.

Figure 15:
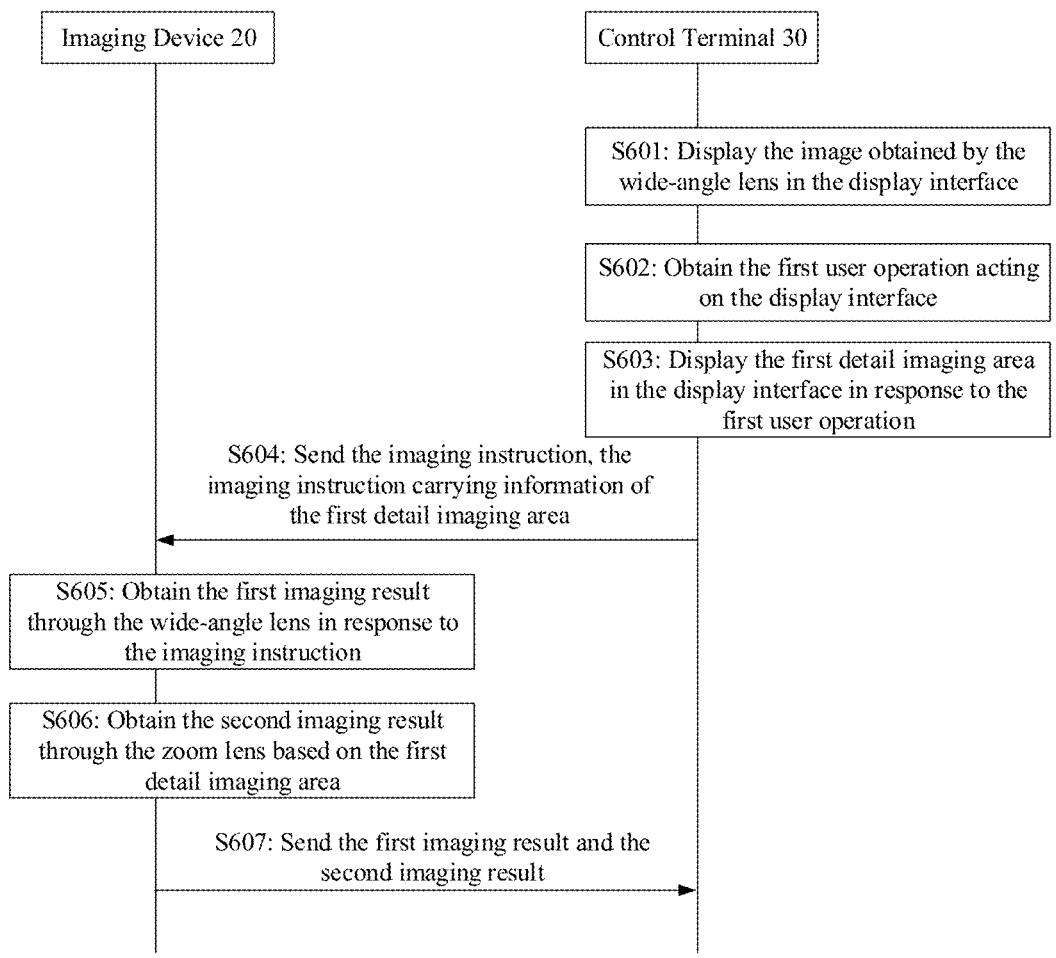
FIG. 15 is a flowchart of the imaging method according to another embodiment of the present disclosure.

Next, another imaging method provided by an embodiment of the present disclosure will be described, and the imaging method can be applied to the imaging system shown in FIG. 1. As shown in FIG. 15, the imaging method includes the following processes.

S601, the control terminal 30 displays an image obtained by the wide-angle lens on the display interface.

Specifically, the process at S601 can be the same as the process at S201, which will not be repeated here.

S602, the control terminal 30 obtains the first user operation acting on the display interface.

Specifically, the process at S602 can be the same as the process at S202, which will not be repeated here.

S603, the control terminal 30 displays the first detail imaging area on the display interface in response to the first user operation.

Specifically, the process at S603 can be the same as the process at S203, which will not be repeated here.

S604, the control terminal 30 sends an imaging instruction to the imaging device 20, the imaging instruction carrying the information of the first detail imaging area.

Specifically, the process at S604 can be the same as the process at S501, which will not be repeated here.

S605, the imaging device 20 obtains the first imaging result through the wide-angle lens in response to the imaging instruction.

Specifically, the process at S605 can be the same as the process at S502, which will not be repeated here.

S606, the imaging device 20 obtains one or more second imaging results through the zoom lens based on the first detail imaging area.

Specifically, the process at S606 can be the same as the process at S503, which will not be repeated here.

S607, the imaging device 20 sends the first imaging result and the second imaging result to the control terminal 30.

Specifically, the process at S607 can be the same as the process at S504, which will not be repeated here.

In some possible embodiments, after the process at S602, the imaging method may further include the following process.

S608, the control terminal 30 displays the number of images to be captured and/or the imaging duration of the zoom lens on the display interface in response to the first user operation.

Specifically, for a schematic diagram showing the number of images to be captured and/or the imaging duration of the zoom lens in the display interface, reference can be made to the shooting information 308 shown in FIG. 4.

In some possible embodiments, after the process at S601, the imaging method may further include the following processes.

S609, the control terminal 30 obtains a second user operation acting on the switching control.

Specifically, the process at S609 can be the same as the process at S204, which will not be repeated here.

S610, the control terminal 30 switches the image being displayed on the display interface to the image obtained by the zoom lens in response to the second user operation.

Specifically, the process at S610 can be the same as the process at S205, which will not be repeated here.

In some possible embodiments, the display interface may also include a zoom factor adjustment control. After the process at S610, the imaging method may further include the following processes.

S611, the control terminal 30 obtains a third user operation acting on the zoom factor adjustment control.

Specifically, the process at S611 can be the same as the process at S206, which will not be repeated here.

S612, updating and displaying the image obtained by the zoom lens in response to the third user operation.

Specifically, the process at S612 can be the same as the process at S207, which will not be repeated here.

Specifically, the zoom factor adjustment control may be used to adjust the zoom factor of the zoom lens. The resolution of the image obtained by the zoom lens before the update and display may be determined by the zoom factor before adjustment, and the resolution of the image obtained by the zoom lens after the update and display may be determined by the adjusted zoom factor.

In some possible embodiments, the display interface may also include an imaging control. The first detail imaging area may include one or more sub-areas. The number of sub-areas may be determined by the zoom factor of the zoom lens, and the one or more sub-areas may be arranged in a preset order. After the process at S603, the imaging method may further include the following process.

S613, the control terminal 30 obtains a fourth user operation acting on the imaging control.

Specifically, the process at S613 can be the same as the process at S208, which will not be repeated here.

The process at S604 described above may be, in response to the fourth user operation, the control terminal 30 sends an imaging instruction to the imaging device 20.

After the process at S604, the imaging method may further include the following process.

S614, the control terminal 30 sequentially marks the sub-areas in a preset order to indicate the current imaging progress in response to the fourth user operation.

Specifically, the process at S614 can be the same as the process at S209, which will not be repeated here.

Specifically, the preset order may be from left to right, and from top to bottom.

Specifically, the method of marking the sub-area may one or more of increasing the display, increasing the display border, increasing the display mark, using a special display color, and using a special transparent display.

In some possible embodiments, after the process at S613, the imaging method may further include the following process.

S615, the control terminal 30 displays the abnormal prompt information on the display interface in response to the fourth user operation, the abnormal prompt information being used to prompt the user that the current imaging is abnormally terminated.

Specifically, the process at S615 can be the same as the process at S210, which will not be repeated here.

In some possible embodiments, after the process at S614, the imaging method may further include the following process.

S616, displaying the first imaging result in the display interface, the first imaging result including the first detail imaging area.

Specifically, the process at S616 can be the same as the process at S211, which will not be repeated here.

S617, the control terminal 30 obtains a fifth user operation acting on the first sub-area.

Specifically, the process at S617 can be the same as the process at S212, which will not be repeated here.

S618, the control terminal 30 displays the second imaging result corresponding to the first sub-area on the display interface in response to the fifth user operation. In some embodiments, the first sub-area may be any one of the one or more sub-areas included in the first detail imaging area.

Specifically, the process at S618 can be the same as the process at S213, which will not be repeated here.

In some possible embodiments, the first detail imaging area may include a plurality of sub-areas. After the process at S618, the imaging method may further include the following processes.

S619, obtaining a sixth user operation acting on the first sub-area.

Specifically, the process at S619 can be the same as the process at S214, which will not be repeated here.

S620, the control terminal 30 displays the second imaging result corresponding to the adjacent sub-area of the first sub-area on the display interface in response to the sixth user operation.

Specifically, the process at S620 can be the same as the process at S215, which will not be repeated here.

In some other possible embodiments, after the process at S602, the imaging method may further include the following process.

S621, the control terminal 30 displays the maximum adjustment range of the first detail imaging area in the display interface in response to the first user operation.

Specifically, the process at S621 can be the same as the process at S216, which will not be repeated here.

In some other possible embodiments, after the process at S621, the imaging method may further include the following processes.

S622, the control terminal 30 obtains a seventh user operation for adjusting the size and/or position of the first detail imaging area.

Specifically, the process at S622 can be the same as the process at S217, which will not be repeated here.

S623, the control terminal 30 determines whether the adjustment for the size and/or position of the first detail imaging area by the seventh user operation exceeds the maximum adjustment range of the first detail imaging area.

Specifically, the process at S623 can be the same as the process at S218, which will not be repeated here.

S624, the control terminal 30 outputs the prompt information if the adjustment of the size and/or position of the first detail imaging area of the seventh user operation exceeds the maximum adjustment range of the first detail imaging area. The prompt information may be used to indicate that the adjustment of the size and/or position of the first detail imaging area by the seventh user operation exceeds the maximum adjustment range of the first detail imaging area.

Specifically, the process at S624 can be the same as the process at S219, which will not be repeated here.

In some other possible embodiments, after the process at S603, the imaging method may further include the following processes.

S625, the control terminal 30 obtains an eighth user operation for adjusting the size and/or position of the first detail imaging area.

Specifically, the process at S625 can be the same as the process at S220, which will not be repeated here.

S626, the control terminal 30 displays the maximum adjustment range of the first detail imaging area on the display interface in response to the eighth user operation.

Specifically, the process at S626 can be the same as the process at S221, which will not be repeated here.

In some other possible embodiments, after the process at S626, the imaging method may further include the following processes.

S627, the control terminal 30 determines whether the adjustment of the size and/or position of the first detail imaging area by the eighth user operation exceeds the maximum adjustment range of the first detail imaging area.

Specifically, the process at S627 can be the same as the process at S222, which will not be repeated here.

S628, the control terminal 30 outputs the prompt information if the adjustment of the size and/or position of the first detail imaging area by the eighth user operation exceeds the maximum adjustment range of the first detail imaging area. The prompt information may be used to indicate that the adjustment of the size and/or position of the first detail imaging area by the eighth user operation exceeds the maximum adjustment range of the first detail imaging area Specifically, the process at S628 can be the same as the process at S223, which will not be repeated here.

The foregoing description describes the method embodiments of the present disclosure in detail. In order to facilitate the implementation of the technical solutions of the embodiments of the present disclosure described above, correspondingly, related devices for implementing the technical solutions described above will be provided below.

Figure 16:
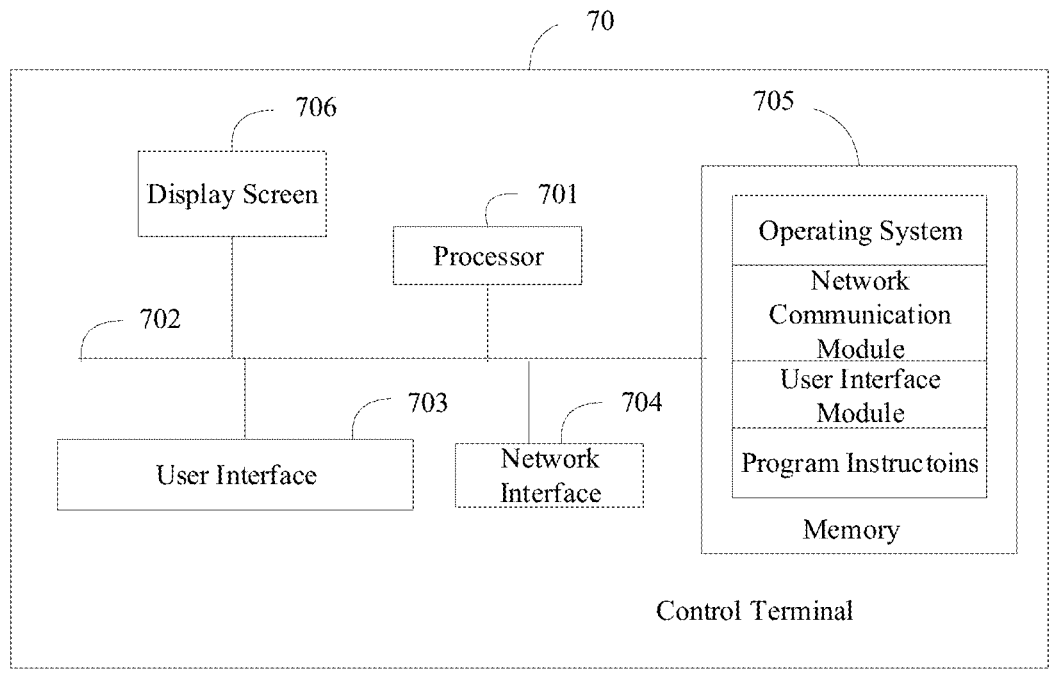
FIG. 16 is a schematic structural diagram of the control terminal according to an embodiment of the present disclosure.

FIG. 16 is a schematic structural diagram of the control terminal according to an embodiment of the present disclosure. As shown in FIG. 16, a control terminal 70 can include at least one processor 701, such as a CPU, at least one network interface 704, a user interface 703, a memory 705, at least one communication bus 702, and a display screen 706. In some embodiments, the communication bus 702 may be used to implement connection and communication between these components, and the user interface 703 may include a touch screen, a keyboard, a mouse, a rocker, etc. The network interface 704 may include a standard wired interface and a wireless interface (such as a Wi-Fi interface), and a communication connection with a server and the imaging device 20 can be established through the network interface 704. The memory 705 may be a high-speed random-access memory or a non-volatile memory, such as at least one disk memory. The memory 705 may include the flash in the embodiments of the present disclosure. The memory 705 may also be at least one storage system located far away from the processor 701 described above. As shown in FIG. 16, the memory 705, which is a computer storage medium, may include an operating system, a network communication module, a user interface module, and program instructions.

It should be noted that the network interface 704 may be connected to an acquirer, a transmitter, or other communication modules, which may include, but are not limited to, a Wi-Fi module, a Bluetooth module, etc. It should be understood that the control terminal 70 in the embodiments of the present disclosure may also include an acquirer, a transmitter, and other communication modules.

The processor 701 can be configured to execute the program instructions stored in the memory 705. When executed by the processor 701, the program instructions can cause the processor 701 to display the image obtained by the wide-angle lens on the display interface of the control terminal through the display screen, obtain the first user operation acting on the image obtained by the wide-angle lens, and display the first detail imaging area in the image obtained by the wide-angle lens in response to the first user operation, the first detail imaging area being used to display the imaging range of the zoom lens.

In some possible embodiments, after obtaining the first user operation acting on the image obtained by the wide-angle lens, the control terminal may be further configured to display the number of images to be captured and/or the imaging duration of the zoom lens on the display interface in response to the first user operation.

In some possible embodiments, the display interface may include a switching control. After displaying the image obtained by the wide-angle lens on the display interface, the control terminal may be further configured to obtain a second user operation acting on the switching control, and switch the image being displayed on the display interface to the image obtained by the zoom lens in response to the second user operation.

In some possible embodiments, the display interface may further include a zoom factor adjustment control. After switching the image being displayed on the display interface to the image obtained by the zoom lens in response to the second user operation, the control terminal may be further configured to obtain a third user operation acting on the zoom factor adjustment control, and updating and displaying the imaging screen of the zoom lens in response to the third user operation.

In some possible embodiments, the zoom factor adjustment control may be used to adjust the zoom factor of the zoom lens. The resolution of the image obtained by the zoom lens before the update and display may be determined by the zoom factor before adjustment, and the resolution of the image obtained by the zoom lens after the update and display may be determined by the adjusted zoom factor.

In some possible embodiments, the display interface may also include an imaging control. The first detail imaging area may include one or more sub-areas. The number of sub-areas may be determined by the zoom factor of the zoom lens, and the one or more sub-areas may be arranged in a preset order. After displaying the first detail imaging area on the display interface, the control terminal may be further configured to obtain a fourth user operation acting on the imaging control, and mark the sub-areas in a preset order to indicate the current imaging progress in response to the fourth user operation.

In some possible embodiments, the preset order may be from left to right, and from top to bottom.

In some possible embodiments, the method of marking the sub-area may one or more of increasing the display, increasing the display border, increasing the display mark, using a special display color, and using a special transparent display.

In some possible embodiments, after obtaining the fourth user operation acting on the imaging control, the control terminal may be further configured to displaying the abnormal prompt information on the display interface in response to the fourth user operation, the abnormal prompt information being used to prompt the user that the current imaging is abnormally terminated.

In some possible embodiments, after marking the sub-areas in the preset order in response to the fourth user operation, the control terminal may be further configured to display the first imaging result in the display interface, the first imaging result including the first detail imaging area; obtain a fifth user operation acting on the first sub-area; and display a second imaging result corresponding to the first sub-area in response to the fifth user operation. In some embodiments, the first sub-area may be any one of the one or more sub-areas included in the first detail imaging area, and the resolution of the second imaging result may be higher than the resolution of the first imaging result.

In some possible embodiments, the first detail imaging area may include a plurality of sub-areas. After displaying the second imaging result corresponding to the first sub-area on the display interface in response to the fifth user operation, the control terminal may be further configured to obtain a sixth user operation acting on the first display interface, and displaying the second imaging result corresponding to the adjacent sub-area of the first sub-area on the display interface in response to the sixth user operation. In some embodiments, the adjacent sub-area may be a sub-area in the plurality of sub-areas.

In some possible embodiments, the imaging angle of the first sub-area and the imaging angle of the adjacent sub-area may be calculated by the imaging device.

In some possible embodiments, after obtaining the first user operation acting on the image obtained by the wide-angle lens, the control terminal may be further configured to display the maximum adjustment range of the first detail imaging area on the display interface in response to the first user operation.

In some possible embodiments, after displaying the maximum adjustment range of the first detail imaging area on the display interface, the control terminal may be further configured to obtain a seventh user operation for adjusting the size and/or position of the first detail imaging area, determining whether the adjustment of the size and/or position of the first detail imaging area by the seventh user operation exceeds the maximum adjustment range of the first detail imaging area, and output the prompt information if the seventh user operation for adjusting the size and/or position of the first detail imaging area exceeds the maximum adjustment range of the first detail imaging area. The prompt information may be used to indicate that the adjustment of the size and/or position of the first detail imaging area by the seventh user operation exceeds the maximum adjustment range of the first detail imaging area.

In some possible embodiments, after displaying the first detail imaging area in the imaging screen obtained by the wide-angle lens, the control terminal may be further configured to obtaining an eighth user operation for adjusting the size and/or position of the first detail imaging area, and displaying the maximum adjustment range of the first detail imaging area on the display interface in response to the eighth user operation.

In some possible embodiments, after displaying the maximum adjustment range of the first detail imaging area on the display interface, the method may further include determining whether the adjustment of the size and/or position of the first detail imaging area by the eighth user operation exceeds the maximum adjustment range of the first detail imaging area, and outputting the prompt information if the adjustment of the size and/or position of the first detail imaging area by the eighth user operation exceeds the maximum adjustment range of the first detail imaging area. The prompt information may be used to indicate that the adjustment of the size and/or position of the first detail imaging area by the eighth user operation exceeds the maximum adjustment range of the first detail imaging area.

It should be understood that the functions of the control terminal 70 in this embodiment can be implemented based on the foregoing method embodiment, which will not be repeated here.

Figure 17:
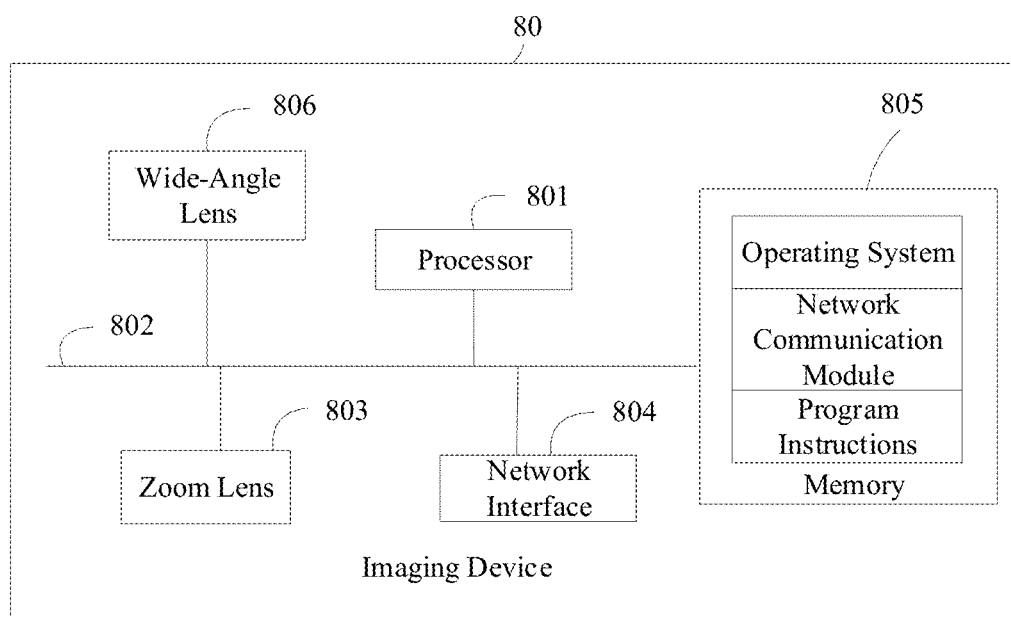
FIG. 17 is a schematic structural diagram of an imaging device according to an embodiment of the present disclosure.

FIG. 17 is a schematic structural diagram of an imaging device according to an embodiment of the present disclosure. As shown in FIG. 17, an imaging device 80 can include at least one processor 801, such as a CPU, at least one network interface 804, a zoom lens 803, a memory 805, a wide-angle lens 806, and at least one communication bus 802. In some embodiments, the communication bus 802 may be used to implement connection and communication between these components. In some embodiments, the network interface 804 may include a standard wired interface and a wireless interface (such as a Wi-Fi interface), and a communication connection can be established with the control terminal 70 through the network interface 804. The memory 805 may be a high-speed random-access memory or a non-volatile memory, such as at least one disk memory. The memory 805 may include the flash in the embodiments of the present disclosure. The memory 805 may also be at least one storage system located far away from the processor 801 described above. As shown in FIG. 17, the memory 805, which is a computer storage medium, may include an operating system, a network communication module, and program instructions.

It should be noted that the network interface 804 may be connected to an acquirer, a transmitter, or other communication modules, which may include, but are not limited to, a Wi-Fi module, a Bluetooth module, etc. It should be understood that the flight trajectory recording device in the embodiments of the present disclosure may also include an acquirer, a transmitter, and other communication modules.

The processor 801 can be configured to execute the program instructions stored in the memory 805. When executed by the processor 801, the program instructions can cause the processor 801 to obtain the imaging instruction sent by the control terminal, the imaging instruction carrying the information of the first detail imaging area; obtaining the first imaging result through the wide-angle lens in response to the imaging instruction; obtaining one or more second imaging results through the zoom lens based on the first detail imaging area, where the first detail imaging area may include one or more sub-areas, and each second imaging result may correspond to a sub-area, the imaging angle of each second imaging result may be calculated by the imaging device, and the resolution of the second imaging result may be higher than the resolution of the first imaging result; and sending the first imaging result and the second imaging result to the control terminal.

In some possible embodiments, the control terminal may include a display interface. Before obtaining the imaging instruction sent by the control terminal, the imaging device may be further configured to obtain the instruction for adjusting the zoom factor of the zoom lens sent by the control terminal, where the instruction for adjusting the zoom factor of the zoom lens may be detected by a zoom factor adjustment control, and the zoom factor adjustment control may be a control in the display interface; adjusting the zoom factor of the zoom lens based on the instruction for adjusting the zoom factor of the zoom lens; and obtaining the imaging screen through the zoom lens, and sending the imaging screen to the display interface, such that the display interface can update and display the control terminal of the zoom lens in the display interface.

In some possible embodiments, the zoom factor adjustment control may be used to adjust the zoom factor of the zoom lens. The resolution of the image obtained by the zoom lens before the update and display may be determined by the zoom factor before adjustment, and the resolution of the image obtained by the zoom lens after the update and display may be determined by the adjusted zoom factor.

In some possible embodiments, the display interface may also include a switching control, which can be used to switch the content being displayed in the display interface to the image obtained by the wide-angle lens.

In some possible embodiments, the display interface may also include the first detail imaging area. The first detail imaging area may be obtained based on the first user operation acting on the display interface, and the first detail imaging area may be used to display the imaging range of the zoom lens.

In some possible embodiments, the display interface may also include the number of images to be captured and/or the imaging duration of the zoom lens.

It should be understood that the function of the imaging device 80 in this embodiment can be implemented based on the foregoing method embodiment, which will not be repeated here.

An embodiment of the present disclosure further provides a computer-readable storage medium. The computer-readable storage medium stores instructions that, when executed by a computer or a processor, cause the computer or the processor to perform one or more processes in any of the foregoing methods. If each component module of the signal processing device is implemented in the form of a software functional unit and sold or used as an independent product, it can be stored in the computer-readable storage medium.

In some embodiments, it may be implemented in whole or in part by software, hardware, firmware, or any combination thereof. When implemented in software, it may be implemented in whole or in part in the form of a computer program product including one or more computer instructions. When computer instructions are loaded and executed on a computer, all or part of the processes or functions according to the embodiments of the present disclosure are generated. The computer may be a general-purpose computer, a special purpose computer, a computer network, or other programmable device. Computer instructions may be stored in a computer-readable storage medium or transmitted from one computer-readable storage medium to another computer-readable storage medium. For example, computer instructions can be transmitted from a website, a computer, a server, or a data center to another website, computer, server, or data center through wired (e.g., coaxial cable, optical fiber, digital subscriber line (i.e., DSL)) or wireless (e.g., infrared, wireless, microwave, etc.). A computer-readable storage medium may be any usable media that can be stored and read by a computer or a data storage device such as a server or a data center etc. containing one or more usable media integrations. An usable media can be a magnetic media (e.g., floppy disk, hard disk, magnetic tape), an optical media (e.g., high-density digital video disc, i.e., DVD), or a semiconductor media (e.g., solid state disk, i.e., SSD), etc.

A person having ordinary skills in the art can appreciate that all or part of the above embodiments may be realized through hardware related to corresponding the computer program. The computer program may be stored in a non-transitory computer-readable medium. When the program is executed by a processor, steps of the above embodiments of the disclosed method may be performed. The storage medium may include a magnetic disk, an optical disk, a read-only memory ("ROM"), a random-access memory ("RAM"), etc. In the case where there is no conflict between the exemplary embodiments, the features of the following embodiments and examples may be combined with each other.

The above embodiments are only the preferred embodiments of the present disclosure, and do not limit the scope of the present disclosure. Therefore, equivalent changes made based on the claims of the present disclosure still fall within the scope of the present disclosure.

What is claimed is:

1. A display method, comprising:
   displaying an image obtained by a wide-angle lens on a display interface;
   obtaining a first user operation acting on the display interface; and displaying a detail imaging area in the display interface in response to the first user operation, the detail imaging area being used to display an imaging range of a zoom lens and a quantity of detail images to be captured based on information of the detail imaging area.

2. The display method of claim 1, further comprising:
displaying an imaging duration of the zoom lens on the display interface in response to the first user operation.

3. The display method of claim 1, further comprising:
obtaining a second user operation acting on a switching control of the display interface; and
switching the image being displayed on the display interface to an image obtained by the zoom lens in response to the second user operation.

4. The display method of claim 3, further comprising:
obtaining a third user operation acting on a zoom factor adjustment control of the display interface; and
updating and displaying the image obtained by the zoom lens in response to the third user operation.

5. The display method of claim 4, wherein:
the zoom factor adjustment control is used to adjust a zoom factor of the zoom lens, a resolution of the image obtained by the zoom lens before updating the display is determined by the zoom factor before the adjustment, and the resolution of the image obtained by the zoom lens after updating the display is determined by the adjusted zoom factor.

6. The display method of claim 1, further comprising:
obtaining a second user operation acting on a zoom factor adjustment control to adjust the zoom factor of the zoom lens;
updating an imaging area division result of the detail imaging area in response to the second user operation, and displaying imaging information of the zoom lens on the display interface, the imaging information including at least one of the quantity of the detail images to be captured or the imaging duration.

7. The display method of claim 1, wherein:
the display interface further includes an imaging control, the detail imaging area including one or more sub-areas, and the number of the sub-areas being determined by the zoom factor of the zoom lens, the one or more sub-areas being arranged in a preset order, and the method further includes:
    obtaining a second user operation acting on the imaging control; and
    marking the sub-areas in the preset order to indicate a current imaging progress in response to the second user operation.

8. The display method of claim 7, wherein:
the preset order is from left to right, or top to bottom.

9. The display method of claim 7, further comprising:
displaying abnormal prompt information on the display interface in response to the second user operation, the abnormal prompt information being used to prompt a user that a current imaging is abnormally terminated.

10. The display method of claim 7, further comprising:
displaying a first imaging result on the display interface, the first imaging result including the detail imaging area;
obtaining a third user operation acting on a first sub-area; and
displaying a second imaging result corresponding to the first sub-area on the display interface in response to the third user operation, wherein the first sub-area is any one of the one or more sub-areas included in the detail imaging area, and a resolution of the second imaging result is higher than a resolution of the first imaging result.

11. The display method of claim 10, further comprising:
obtaining a fourth user operation acting on the first sub-area; and
displaying the second imaging result corresponding to an adjacent sub-area of the first sub-area on the display interface in response to the fourth user operation, the adjacent sub-area being a sub-area in the plurality of sub-areas.

12. The display method of claim 11, wherein:
an imaging angle of the first sub-area and an imaging angle of the adjacent sub-area are calculated by an imaging device, the imaging device including the wide-angle lens and the zoom lens.

13. The display method of claim 1, further comprising:
displaying a maximum adjustment range of the detail imaging area on the display interface.

14. The display method of claim 13, further comprising:
obtaining a second user operation for adjusting size and/or position of the detail imaging area;
determining whether an adjustment of the size and/or position of the detail imaging area by the second user operation exceeds the maximum adjustment range of the detail imaging area; and
outputting prompt information if the adjustment of the size and/or position of the detail imaging area by the second user operation exceeds the maximum adjustment range of the detail imaging area, the prompt information being used to indicate that the adjustment of the size and/or position of the detail imaging area by the second user operation exceeds the maximum adjustment range of the detail imaging area.

15. The display method of claim 1, further comprising:
obtaining a second user operation for adjusting size and/or position of the detail imaging area; and
displaying a maximum adjustment range of the detail imaging area on the display interface in response to the second user operation.

16. The display method of claim 15, further comprising:
determining whether an adjustment of the size and/or position of the detail imaging area by the second user operation exceeds the maximum adjustment range of the detail imaging area; and
outputting prompt information if the adjustment of the size and/or position of the detail imaging area by the second user operation exceeds the maximum adjustment range of the detail imaging area, the prompt information being used to indicate that the adjustment of the size and/or position of the detail imaging area by the second user operation exceeds the maximum adjustment range of the detail imaging area.

17. The display method of claim 1, wherein the quantity of the detail images to be captured is determined based on the imaging range of the zoom lens, a zoom factor of the zoom lens, and an overlap rate.

18. A control terminal, comprising:
a display interface;
one or more processors; and
one or more memories storing one or more instructions that, when executed by the one or more processors, cause the one or more processors to:
    control the display interface to display an image obtained by a wide-angle lens on the display interface;

obtain a first user operation acting on the display interface; and control the display interface to display a detail imaging area in the display interface in response to the first user operation, the detail imaging area being used to display an imaging range of a zoom lens and a quantity of detail images to be captured based on information of the detail imaging area.

19. The control terminal of claim 18, wherein the quantity of the detail images to be captured is determined based on the imaging range of the zoom lens, a zoom factor of the zoom lens, and an overlap rate.

20. A non-transitory computer readable storage medium including instructions stored thereon which, when executed by one or more processors, cause the one or more processors to:

control a display interface to display an image obtained by a wide-angle lens on the display interface;

obtain a first user operation acting on the display interface; and control the display interface to display a detail imaging area in the display interface in response to the first user operation, the detail imaging area being used to display an imaging range of a zoom lens and a quantity of detail images to be captured based on information of the detail imaging area.

* * * * *